(12) United States Patent
Coburn et al.

(10) Patent No.: US 11,845,381 B2
(45) Date of Patent: Dec. 19, 2023

(54) SYSTEMS AND METHODS FOR CONTROLLING A VEHICLE CAMERA

(71) Applicant: Rivian IP Holdings, LLC, Irvine, CA (US)

(72) Inventors: Matthew Coburn, Milford, MI (US); Mark Vinnels, Plymouth, MI (US); Oliver Jeromin, Bloomfield Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/671,410

(22) Filed: Feb. 14, 2022

(65) Prior Publication Data
US 2022/0161722 A1    May 26, 2022

Related U.S. Application Data

(63) Continuation of application No. 16/682,317, filed on Nov. 13, 2019, now Pat. No. 11,279,283.
(Continued)

(51) Int. Cl.
*B60R 1/00* (2022.01)
*B60K 35/00* (2006.01)
(Continued)

(52) U.S. Cl.
CPC .............. *B60R 1/00* (2013.01); *B60K 35/00* (2013.01); *H04N 7/181* (2013.01); *H04N 23/695* (2023.01); *B60K 2370/166* (2019.05); *B60K 2370/167* (2019.05); *B60K 2370/176* (2019.05); *B60K 2370/21* (2019.05);
(Continued)

(58) Field of Classification Search
None
See application file for complete search history.

(56) References Cited

U.S. PATENT DOCUMENTS

| | | |
|---|---|---|
| 2002/0075387 A1 | 6/2002 | Janssen |
| 2010/0164702 A1 | 7/2010 | Sasaki |
| (Continued) | | |

FOREIGN PATENT DOCUMENTS

| | | |
|---|---|---|
| CN | 102821267 A | 12/2012 |
| CN | 103802725 A | 5/2014 |
| (Continued) | | |

OTHER PUBLICATIONS

International Search Report and Written Opinion in PCT/US2019/061158 dated Jan. 29, 2020.

*Primary Examiner* — James M Anderson, II
(74) *Attorney, Agent, or Firm* — Haley Guiliano LLP (57) ABSTRACT

Camera control systems and methods for providing a dynamic view of the environment outside of a vehicle are presented. One or more cameras are configured to capture at least one view of the environment outside of the vehicle. Control circuitry detects at least one of the speed of the vehicle and the pitch angle of the vehicle (e.g., by using a speedometer and inclinometer). The control circuitry selects a view angle based on the at least one of the speed of the vehicle and the pitch angle of the vehicle. The control circuitry then displays, based on an output of the at least one camera, a view of the environment outside of the vehicle from the selected view angle on a display of the vehicle.

15 Claims, 4 Drawing Sheets

Related U.S. Application Data

(60) Provisional application No. 62/760,727, filed on Nov. 13, 2018.

(51) Int. Cl.
*H04N 7/18* (2006.01)
*H04N 23/695* (2023.01)

(52) U.S. Cl.
CPC ..... *B60K 2370/31* (2019.05); *B60R 2300/105* (2013.01); *B60R 2300/308* (2013.01); *B60R 2300/605* (2013.01); *B60R 2300/8086* (2013.01)

(56) References Cited

U.S. PATENT DOCUMENTS

| | | | |
|---|---|---|---|
| 2016/0182863 A1* | 6/2016 | Watanabe | B60R 1/00 348/148 |
| 2017/0285649 A1 | 10/2017 | Debreczeni | |
| 2018/0152628 A1 | 5/2018 | Patel | |
| 2018/0308275 A1* | 10/2018 | Fortmann | G06T 15/205 |
| 2019/0202356 A1* | 7/2019 | Cano | G06T 15/20 |

FOREIGN PATENT DOCUMENTS

| | | |
|---|---|---|
| CN | 104010163 A | 8/2014 |
| DE | 10 2008 046544 | 5/2009 |
| DE | 10 2015 207974 | 11/2016 |
| DE | 102018220279 A1 | 5/2019 |
| EP | 3176037 A1 | 6/2017 |
| WO | 2017/037266 A1 | 3/2017 |

\* cited by examiner

SYSTEMS AND METHODS FOR CONTROLLING A VEHICLE CAMERA

CROSS REFERENCE TO RELATED APPLICATION

This application is a continuation of U.S. patent application Ser. No. 16/682,317, filed Nov. 13, 2019, which claims the benefit of U.S. Provisional Application No. 62/760,727, filed Nov. 13, 2018. The entire contents of which are incorporated by reference herein in their entireties.

SUMMARY

A single camera of a vehicle can typically provide a view from only a single angle (e.g., a backup camera may provide only a single view angle). In one approach, a user may be allowed to manually select one of several views available from a camera (e.g., from a camera that has several selectable positions). However, when the user is engaged in driving a vehicle (e.g., driving the vehicle in off-road conditions), the user is typically unable to manually shift the camera view to fit the changing driving conditions. In addition, a single view from a camera may not provide the needed driving information. Consequently, what is needed is a camera control system that automatically adjusts the view to suit the dynamic situation.

In accordance with the present disclosure, systems and methods are provided that improve the operation of a camera system of a vehicle. A vehicle may include one or more physical cameras providing a view of an environment outside of the vehicle. In some embodiments, some (or all) of the cameras may provide a single, fixed view. In some embodiments, some (or all) of the cameras may be adjustable to provide one of several selectable views.

The vehicle may include a sensor or sensors for measuring the speed of the vehicle. For example, the vehicle may include a speedometer, a GPS sensor, any other speed sensor, or any combination thereof. The vehicle may include a sensor or sensors for measuring the pitch of the vehicle. For example, the vehicle may include an inclinometer, a tiltmeter, any other pitch sensor, or any combination thereof. The car system may use one or both of the speed and pitch measurements to select a view angle of the outside environment on one or more displays of the vehicle.

In some embodiments, the speed, the pitch, or a combination of the two may be used to select one of the available physical cameras and/or to adjust the selectable view of the physical camera. For example, the angle and/or the horizontal position of the physical camera (e.g., position of the camera in relation to the length dimension of the vehicle) may be selected based on the speed, the pitch, or a combination of the two.

In some embodiments, one or more of the cameras may be used to generate a single virtual view from a virtual camera. In such embodiments, the system may select a view angle of the virtual camera based on the speed, the pitch, or a combination of the two. Additionally, the system may select a horizontal view position of the virtual camera based on the speed, the pitch, or a combination of the two. The system may then generate for display a virtual representation of the outside environment that is configured to be the same or similar to a view that would be generated by a physical camera if it were placed in the position of the virtual camera. The virtual representation may be displayed on one or more of the displays of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to methods and systems for operating a camera system of a vehicle. For example, the methods described herein may be implemented using camera system 100 of vehicle 104 depicted in FIG. 1A.

In some embodiments, camera system 100 may include at least one camera configured to capture at least one view of the environment outside of vehicle 104 and a display for displaying views of the environment outside vehicle 104 based on an output of the at least one camera. For example, the at least one camera may be mounted on the frame of vehicle 104 and/or inside of vehicle 104. In some embodiments, camera system 100 also includes control circuitry configured to control what is displayed on the screen (e.g., as depicted in more detail in FIG. 3).

Figure 1A:
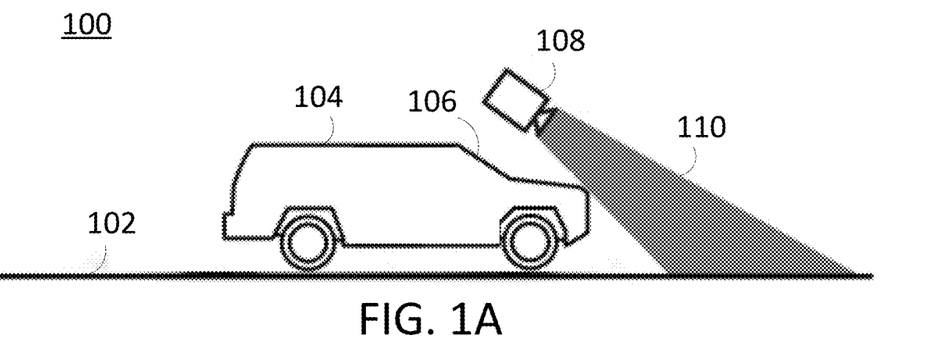
FIG. 1A shows a side view of a vehicle, in accordance with some embodiments of the present disclosure.

In some embodiments, the control circuitry may be communicatively connected to a speed sensor that provides the current speed of vehicle 104. In some embodiments, the control circuitry may be communicatively connected to one or more orientation sensors that provide data indicative of the orientation of vehicle 104 in 3D space. For example, orientation sensors may provide data indicative of a pitch angle of vehicle 104, yaw angle of vehicle 104, and roll angle of vehicle 104.

In some embodiments, the control circuitry may use the output of the speed and orientation sensors to detect at least one of the speed of vehicle 104 and pitch angle of vehicle 104. For example, the control circuitry may detect that the vehicle is moving at 4 MPH and has a pitch angle of 10°.

In some embodiments, the control circuitry may select a view angle based on at least one of the speed of vehicle 104 and the pitch angle of vehicle 104. In some embodiments, the control circuitry may select the view angle based solely on the pitch angle of vehicle 104. For example, the control circuitry may select a view angle that is negatively correlated to the pitch angle of vehicle 104 (e.g., as the positive pitch angle of the vehicle increases, the negative view angle decreases). In some embodiments, the view angle (A) may be computed based on pitch angle (P) according to the formula:

$$A = \left(\frac{C1}{P}\right) - C2,$$

where C1 and C2 are predetermined constants (e.g. where C2 is a positive number). In another example, another formula may be used: A=P−C22 (e.g. where C22 is a positive number). In yet another example, the control circuitry may select a pitch angle based on the table presented below (or a similar table).

TABLE 1

| Vehicle Pitch | View Angle |
|---|---|
| 10° | −30° |
| 20° | −35° |
| 30° | −45° |
| 40° | −50° |
| 45° | −55° |

In some embodiments, the control circuitry may select the view angle based on the speed of vehicle 104. For example, the control circuitry may select a view angle that is positively correlated to the speed of vehicle 104. In some embodiments, the view angle (A) may be computed based on vehicle speed (S) according to the formula: A=(S*C3)+C4, where C3 and C4 are predetermined constants (e.g., where C4 is a positive number). In another example, the control circuitry may select a pitch angle based on the table presented below (or a similar table).

TABLE 2

| Vehicle Speed | View Angle |
|---|---|
| 2 MPH | −50° |
| 4 MPH | −40° |
| 6 MPH | −30° |
| 8 MPH | −20° |
| 10 MPH | −10° |

In some embodiments, the control circuitry may select the view angle based on both the speed of vehicle 104 and the pitch angle of vehicle 104. For example, the control circuitry may calculate the view angle such that is negatively correlated to the pitch angle of vehicle 104 and positively correlated to the speed of vehicle 104. In some embodiments, the view angle (A) may be computed based on vehicle speed (S) and pitch angle (P) according to the formula:

$$A = C5 * \left(\frac{S}{P}\right) + C6,$$

where C5 and C6 are predetermined constants. In another example, the control circuitry may select a pitch angle based on the table presented below (or a similar table) which shows precomputed pitch angles for all or some pitch and speed values of vehicle 104.

TABLE 3

|  | 10° | 20° | 30° | 40° |
|---|---|---|---|---|
| 2 MPH | −19° | −19.5° | −19.7° | −20° |
| 4 MPH | −18° | −19° | −19.3° | −19.5° |
| 6 MPH | −17° | −18.5° | −19° | −19.2° |
| 8 MPH | −16° | −18° | −18.6° | −19° |

In some embodiments, the control circuitry may also select a horizontal view position relative vehicle 104 based on at least one of the speed of vehicle 104 and pitch angle of vehicle 104. For example, the control circuitry may select a horizontal view position that is in front of a bumper of vehicle 104 when the car has a steep positive pitch angle (e.g., pitch angle over 30°) or a steep negative pitch angle (e.g., pitch angle under −30°). In another example, the control circuitry may select a horizontal view position that is behind the front of vehicle 104 when the car has a shallow pitch angle (e.g., pitch angle between −30° and 30°). In some embodiments, the control circuitry may select the horizontal view position proportional to the pitch of vehicle 104. In some embodiments, the control circuitry may select the horizontal view position proportional to the speed of vehicle 104. In some embodiments, circuitry may select the horizontal view position based on both the speed of vehicle 104 and pitch of vehicle 104. In some embodiments, the control circuitry may select the horizontal view position such that that is in front of the bumper of vehicle 104 when the pitch of vehicle 104 is negative (e.g., when vehicle 104 is driving downhill), and such that that is behind the bumper of vehicle 104 when the pitch of vehicle 104 is positive (e.g., when vehicle 104 is driving uphill).

In some embodiments, after the view angle is selected (and optionally when the horizontal view position is selected), the control circuitry may generate for display a view of the environment outside of vehicle 104 from the selected view angle. In some embodiments, the view may be generated on any display of vehicle 104. For example, the view may be generated on a screen located behind the steering wheel or on the instrument panel. In some embodiments, the view may be generated on front windshield 106 of vehicle 104 (e.g., as a heads-up display).

In some embodiments, the view angle and the horizontal view position are selected to provide a best possible view to a driver who is navigating vehicle 104 over off-road terrain. For example, when vehicle 104 is moving slowly uphill, a view from a large negative angle can provide the driver with information about the terrain the wheels are about to drive over. When the pitch of vehicle 104 decreases (or when speed increases), a smaller negative view angle would allow the driver to see more of the terrain ahead of vehicle 104.

In some embodiments, the control circuitry may generate the view for display based on output of the at least one camera. In some embodiments, the at least one camera is a multi-angle camera that has variable pitch angles. In this case, the control circuitry may modify the physical position and/or orientation of the at least one camera based on at least one of the speed of vehicle 104 and pitch angle of vehicle 104. For example, the control circuitry may modify the physical position and/or orientation of the at least one camera to have a pitch angle that matches the selected view angle. In some embodiments, the control circuitry may modify the physical position and/or orientation of the at least one camera to have a pitch angle that is as close as possible to the selected view angle. The control circuitry may then display the output of that camera on a display of vehicle 104.

In some embodiments, one of the cameras of vehicle 104 may be a wide-angle camera. In this case, the control circuitry may modify the wide-angle output (e.g., by cropping and distortion techniques) to produce a view from the selected view angle. In some embodiments, vehicle 104 may have several cameras located at multiple positions and angles. In this case, the control circuitry may generate a virtual view from the selected view angle by combining outputs of the multiple cameras. The generated virtual view may then be displayed on the screen.

In some embodiments, the control circuitry may generate a view from a virtual camera. The term virtual camera may refer to any kind of camera object that is generated as software representation of a real camera that does not exist as a physical camera. For example, a virtual camera may be a software module that emulates operation of a real camera. In some embodiments, the virtual camera software module may emulate an output of a camera as if it were placed in a certain location. For example, the virtual camera software module may emulate an output of a real camera by combining output of real cameras and/or extrapolating the view based on the outputs of several real cameras. In some embodiments, the control circuitry may generate a virtual camera that emulates an output of a real physical camera, as if that real camera were placed in a position corresponding to the selected horizontal view position and oriented at a pitch corresponding to the selected view angle. Then, the control circuitry may use the virtual camera to generate a virtual view (e.g., by using outputs of multiple cameras) that is equivalent or similar to a view that would be produced if a real camera were placed in the position of the virtual camera. The generated virtual view may be displayed on a display of vehicle 104.

In some embodiments, the control circuitry may also display a predicted path of front wheels of the vehicle overlaid over the view of the environment outside of the vehicle from the selected view angle.

FIG. 1A shows a side view of vehicle 104 which operates camera system 100, in accordance with some embodiments of the present disclosure. In some embodiments, vehicle 104 may be a coupe, a sedan, a truck, a bus, or any other type of vehicle. In some embodiments, the vehicle may include at least one camera configured to capture at least one view of the environment outside of the vehicle. For example, vehicle 104 may include at least one camera mounted under the front bumper, on top of the front bumper, on the roof, near the headlights, in any other part of the vehicle, or in any combination of the above.

As shown in FIG. 1A, vehicle 104 is traveling over a level surface 102 (e.g., a surface sloped at 0°). Accordingly, the pitch of vehicle 104 may be determined to be 0°. In some embodiments, the control circuitry of vehicle 104 may select a viewing angle based on the determined pitch angle. For example, the pitch angle may be selected based on Table 1 or based on any of the formulas disclosed above. For example, the control circuitry may select a relatively small negative view angle (e.g., −20°) based on the pitch angle of the car being 0°.

In some embodiments, the control circuitry may also select a horizontal view position based on the pitch of vehicle 104. For example, the horizontal view position may be selected proportional to the pitch angle of vehicle 104 or to absolute value of the pitch angle. In this example, as the absolute value of the pitch angle increases, the selected horizontal view position moves further forward in the direction defined by the lengths of vehicle 104. In some embodiments, the view angle and the horizontal view position may additionally or alternatively be based on the speed of vehicle 104. For example, the control circuitry may select the horizontal view position to be behind the front of vehicle 104 (e.g., 2 feet behind the front of vehicle 104) based on the pitch angle being shallow. In some embodiments, the control circuitry may select the horizontal view position to be in front of the bumper of vehicle 104 (e.g., 2 feet in front of the front of vehicle 104) if the pitch angle is steep.

Once the pitch angle and horizontal view position are computed, the control circuitry may place virtual camera 108 at the calculated horizontal view position (e.g., 2 feet behind the front of vehicle 104) at the calculated angle (e.g., at −20° angle). In some embodiments, the control circuitry may then generate for display a view of the environment outside of the vehicle from the selected view angle and the selected horizontal view position. In some embodiments, the control circuitry may adjust one of the adjustable physical cameras of vehicle 104 to match the calculated horizontal view position and the calculated angle, and then generate for display view 110 as produced by that camera. In some embodiments, the control circuitry may generate view 110 (e.g., by using outputs of multiple cameras of the vehicle) that would be generated if a real camera were placed in the location of virtual camera 108 shown in FIG. 1A. For example, the control circuitry may use any graphics modeling and extrapolation software to generate view 110 based on the signals provided by multiple physical cameras that capture other views of the outside environment. In some embodiments, view 110 may be generated for display on any display of vehicle 104 (e.g., on the front windshield heads-up display 106).

Figure 1B:
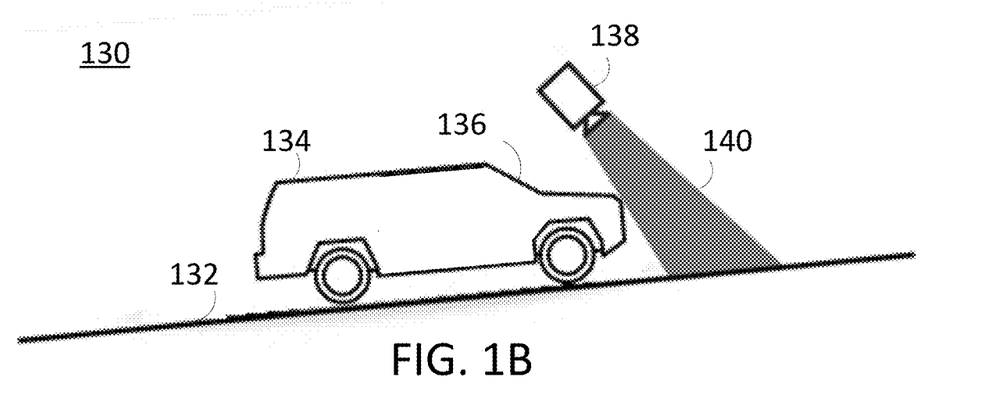
FIG. 1B shows another side view of a vehicle, in accordance with some embodiments of the present disclosure.

FIG. 1B shows a side view of vehicle 134 that operates camera system 130, in accordance with some embodiments of the present disclosure. In some embodiments, vehicle 134 may be the same as vehicle 104 shown in FIG. 1A.

As shown in FIG. 1B, vehicle 134 is traveling over an inclined surface 132 (e.g., a 10° surface). In some embodiments, the control circuitry of the vehicle selects a larger negative view angle (e.g., −45°) based on the pitch angle of the car being 10°. Thus, the control circuitry may place a virtual camera (as shown in FIG. 1B) at a −45° angle. In some embodiments, the control circuitry may also select a horizontal view position as one foot back from the front of vehicle 134. In some embodiments, the control circuitry may then generate for display view 140 of the environment outside of vehicle 134 from the selected view angle and the selected horizontal view position. For example, the control circuitry may generate view 140 (using cameras of the vehicle) that would be generated if a real camera were placed in the location of virtual camera 138. In some embodiments, view 140 may be generated for display on any display of vehicle 134 (e.g., on the front windshield heads-up display 136).

Figure 1C:
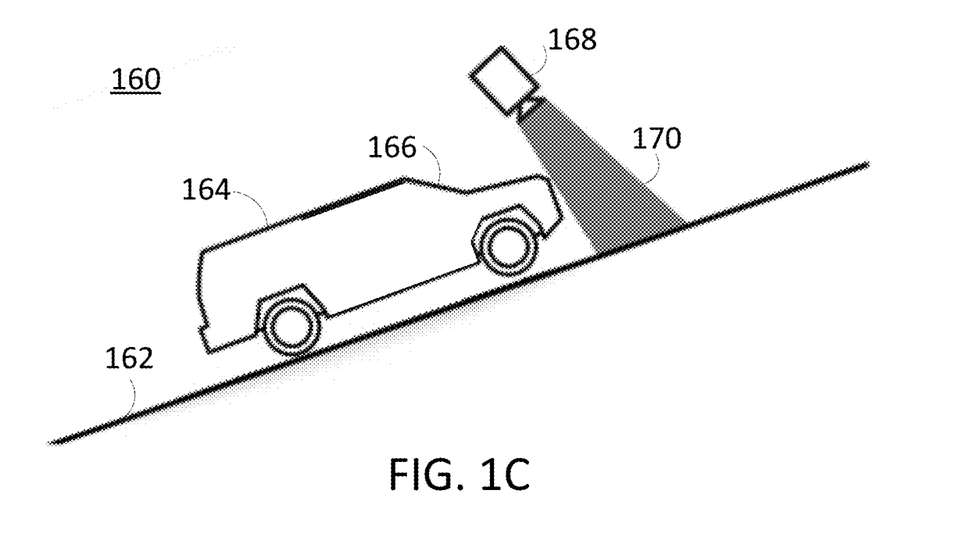
FIG. 1C shows yet another side view of a vehicle, in accordance with some embodiments of the present disclosure.

FIG. 1C shows a side view of vehicle 164 which operates camera system 160, in accordance with some embodiments of the present disclosure. In some embodiments, vehicle 164 may be the same as vehicles 104 and 134 shown in FIGS. 1A and 1B.

As shown in FIG. 1C, vehicle 164 is traveling over inclined surface 162 (e.g., a 30° surface). In some embodiments, the control circuitry of the vehicle selects an even larger negative view angle (e.g., −70°) based on the pitch angle of the car being 30°. For example, the control circuitry may place virtual camera 168 at −70° angle. In some embodiments, the control circuitry may also select a horizontal view position as being right over the front bumper of the vehicle. In some embodiments, the control circuitry may then generate for display view 170 of the environment outside of vehicle 164 from the selected view angle and the selected horizontal view position. For example, the control circuitry may generate view 170 (using cameras of the vehicle) that would be generated if a real camera were placed in the location of virtual camera 168.

In some embodiments, the control circuitry may select the view angle and the horizontal view position for the vehicle depicted in FIGS. 1A, 1B, and 1C in a manner describe above. For example, the control circuitry may select the view angle that is negatively correlated to the pitch angle of the vehicle and positively correlated to the speed of the vehicle. In some embodiments, view 170 may be generated for display on any display of vehicle 164 (e.g., on the front windshield heads-up display 166).

Figure 2:
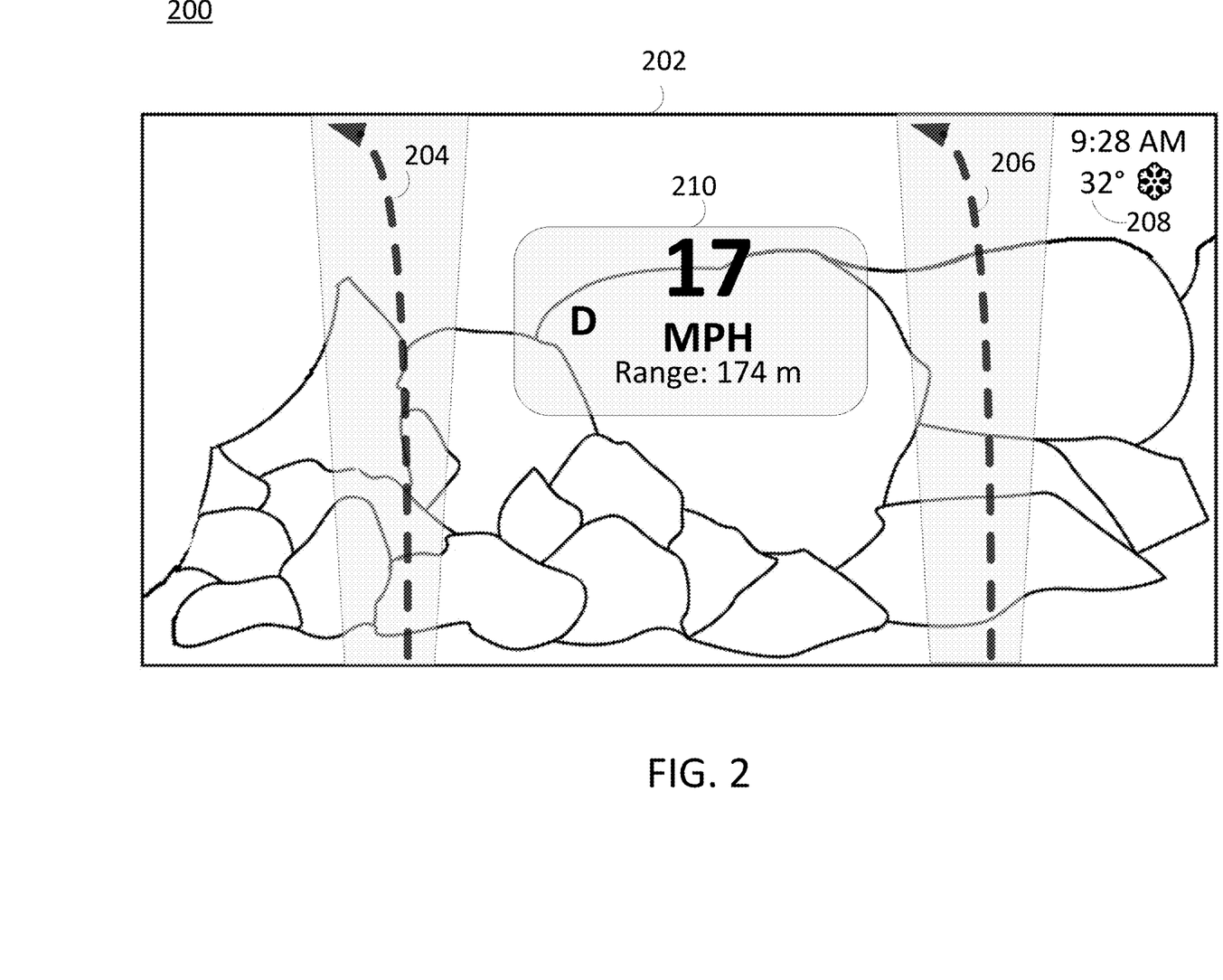
FIG. 2 shows an illustration of a display of a vehicle, in accordance with some embodiments of the present disclosure.

FIG. 2 shows an exemplary illustration 200 of display 202 of a vehicle (e.g., one of vehicles 104, 134, 164 of FIGS. 1A-1C), in accordance with some embodiments of the present disclosure. In particular, FIG. 2 shows a view generated by the control circuitry on a heads-up display of a vehicle (e.g., one of displays 106, 136, 166). In some embodiments, the control circuitry generates for display a view of the environment outside of the vehicle (e.g., the rocky surface shown in FIG. 2) from the selected view angle and from the selected horizontal view position which were calculated according to techniques described above and below. For example, the view of the rocky surface may be a view generated by a virtual camera (e.g., one of virtual cameras 108, 138, 168) that is placed at the selected horizontal view position at the selected view angle. In some embodiments, the view generated for display on display 202 by the virtual camera may be the same or similar to a view that would be generated by a physical camera if it were physically positioned at the selected horizontal view position at the selected view angle.

In some embodiments, the control circuitry may also generate for display predicted paths of the front wheels of the vehicle 204, 206 overlaid over the view of the environment outside of the vehicle from the selected view angle. For example, the control circuitry may generate for display two arrows 204, 206 as seen in FIG. 2, where left arrow 204 indicates a turn angle of the left front wheel and its predicted path over the environment outside of the vehicle, and where right arrow 206 indicates a turn angle of the right front wheel and its predicted path over the environment outside of the vehicle. This technique may be utilized, for example, when the driver of the vehicle is trying to navigate around and over rocks and boulders off-road. This may eliminate the need for a spotter outside the vehicle to provide instructions to the driver.

In some embodiments, the control circuitry may also generate for display on display 202 additional vehicle information 210 (e.g., speed, range, and current gear the vehicle is in). The control circuitry may also generate for display on display 202 additional information 208 (e.g., time and current weather information).

In some embodiments, the control circuitry may also generate for display on display 202 a representation of the vehicle. In some embodiments, the representation may include a number next to each wheel, where the number is indicative of torque being applied to the respective wheel. In some embodiments, the control circuitry may also generate for display on display 202 another representation of the vehicle. In some embodiments, the representation may be turned in a way that is indicative of orientation of the vehicle in 3D space. For example, the representation of the vehicle may have pitch, roll, and yaw angles that match the pitch, roll, and yaw angles of the vehicle. In some embodiments, the representation may include numbers indicative of pitch and roll angles.

While the foregoing discussion of FIGS. 1-2 describes some embodiments for selecting a view angle and a horizontal view position, in some embodiments, only a view angle is selected, while the horizontal view position remains constant. In some embodiments, any suitable technique may be used to generate a view of the environment outside of the vehicle from the selected view angle. For example, the view of the environment from the selected view angle may be generated by adjusting orientation of a single camera of vehicle 104. In another example, the view of the environment from the selected view angle may be generated by cropping and/or transforming a view of a single camera (e.g., a wide-lens camera). In yet another example, the view of the environment from the selected view angle may be generated by selecting an output of one of multiple cameras. In yet a further example, the view of the environment from the selected view angle may be generated by combining the outputs of multiple cameras. In some embodiments, any combination of these techniques or other techniques may also be used to generate the view of the environment from the selected view angle.

Figure 3:
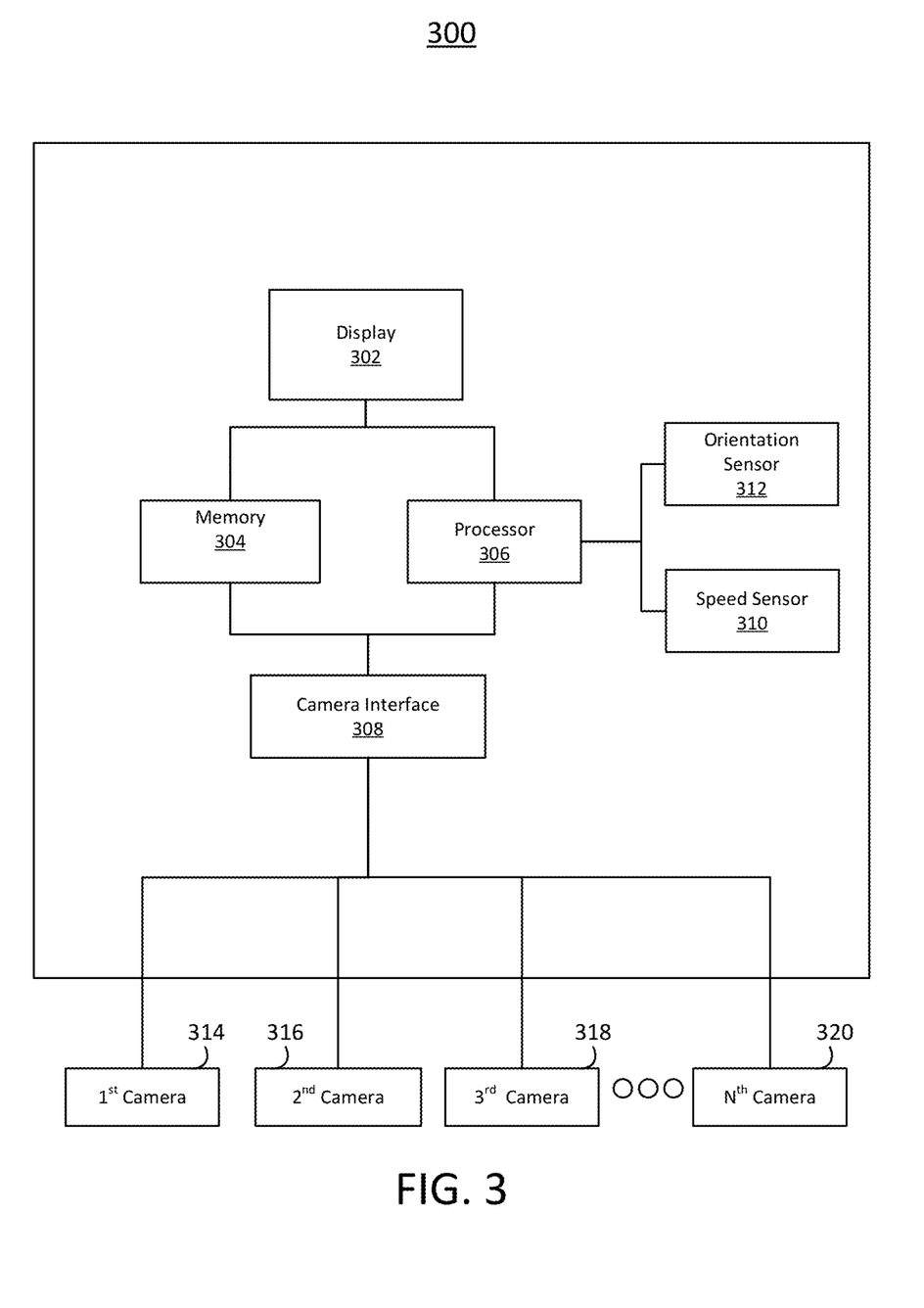
FIG. 3 shows a block diagram of components of a camera system, in accordance with some embodiments of the present disclosure.

FIG. 3 shows a block diagram of components of camera system 300 of a vehicle (e.g., of vehicles 104, 134, 164 depicted in FIGS. 1A, 1B, and 1C), in accordance with some embodiments of the present disclosure. In some embodiments, camera system 300 may include processor 306. The processor may comprise a hardware CPU for executing commands stored in memory 304 or software modules, or combination thereof. In some embodiments, processor 306 and memory 304 in combination may be referred to as control circuitry of system 300. In some embodiments, processor 306 alone may be referred to as control circuitry of system 300.

In some embodiments, camera system 300 may include memory 304. In some embodiments, memory 304 may include hardware elements for non-transitory storage of commands or instructions, that, when executed by processor 306, cause processor 306 to operate the camera system 300 in accordance with embodiments described above and below.

In some embodiments, processor 306 may be communicatively connected to sensors (e.g., a speed sensor 310 and an orientation sensor 312). Speed sensor 310 may be one of a speedometer, a GPS sensor, any other speed sensor, or any combination thereof. Orientation sensor 312 may be an inclinometer, a tiltmeter, any other pitch sensor, or any combination thereof. Speed sensor 310 may provide the vehicle's speed to processor 306. Orientation sensor 312 may provide vehicle orientation values (e.g., vehicle's pitch and/or vehicles' roll) to processor 306. In some embodiments, the sensors may be included as part of other vehicle components (e.g., a self-driving system) and processor 306 may be communicatively connected to these other vehicle components to obtain the sensor readings.

In some embodiments, processor 306 may be communicatively connected (e.g., via a camera interface) to several cameras 1-N (e.g., cameras 314-320). In some embodiments, each of the cameras 314-320 may capture at least one view of the environment outside of the vehicle and provide an output indicative of the view to processor 306. In some embodiments, processor 306 may control position of the cameras 314-320 via the camera interface 308. For example, the camera interface may provide electrical power to a motor or motors to change angles of one or more of the cameras 314-320.

In some embodiments, camera interface 308 may provide visual data generated by cameras 314-320 to processor 306. Processor 306 may use speed data from speed sensor 310 and orientation data from orientation sensor 312 to calculate a desired view angle and/or desired horizontal view position (e.g., as described above or below). If one of cameras 314-320 can provide a view from that desired view angle and/or from the horizontal view position, processor 306 uses camera interface 308 to request a view from that camera. In some embodiments, if that camera is adjustable, camera interface 308 may adjust that camera to match the desired view angle and/or desired horizontal view position. Then processor 306 may output the data of that camera on display 302 (e.g., display 202 of FIG. 2).

In some embodiments, the processor may use cameras 314-320 to generate a view from a virtual camera that is placed at the desired view angle and/or desired horizontal view position by combining and extrapolating the desired view based on one or more views provided by one or more of cameras 314-320. Then processor 306 may generated for display a view produced virtual camera on display 302 (e.g., display 202 of FIG. 2).

Figure 4:
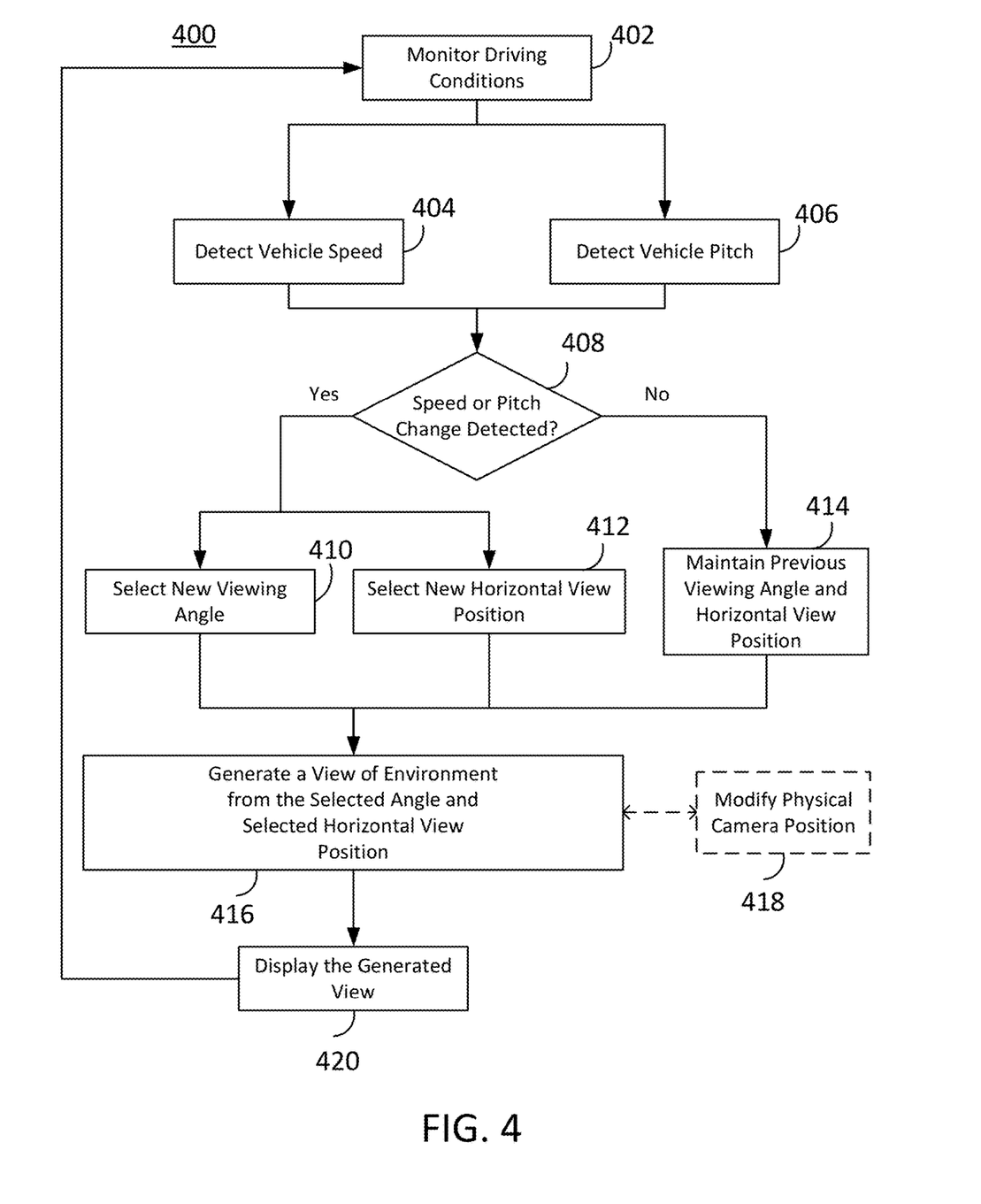
FIG. 4 shows a flowchart for a method of operating a camera system of a vehicle, in accordance with some embodiments of the present disclosure.

FIG. 4 is an illustrative flowchart of a process 400 for controlling a camera system (e.g., system 300 of FIG. 3), in accordance with some embodiments of the disclosure. Process 400 may be executed by control circuitry (e.g., by processor 306 of FIG. 3).

At 402, the control circuitry may monitor driving conditions of a vehicle (e.g., vehicle 104 of FIG. 1). For example, the control circuitry may receive data from vehicles sensors (e.g., sensors 310 and 312 of FIG. 3). In some embodiments, step 402 is performed periodically (e.g., every 5 or 10 seconds). For example, at step 404, the control circuitry, may acquire the vehicle's speed from a speedometer or another speed sensor. Additionally, at step 406, the control circuitry may acquire the vehicle's pitch from an inclinometer or another orientation sensor.

At 408, the control circuitry may check whether either the speed or the pitch (or both) has changed from the previous periodic measurement at step 402. For example, if either the speed or pitch has changed by more than 5%, the control circuitry proceeds to steps 410 and 412. Otherwise, the control circuitry proceeds to step 414. At step 414, the control circuitry may maintain the view angle and horizontal view position that were previously computed at steps 410 and 412.

At 410, the control circuitry may compute a new viewing angle. In some embodiments, the new view angle may be computed based on one or both of vehicle speed computed at step 404 and vehicle pitch computed at step 406. For example, the control circuitry may compute the new view angle using any of the formulas described above or by using any one of Tables 1-3. In some embodiments, the new view angle may be positively correlated to speed and negatively correlated to the view angle.

At 412, the control circuitry may compute a new horizontal view position. In some embodiments, the new horizontal view position may be computed based on one or both of vehicle speed computed at step 404 or vehicle pitch computed at step 406. For example, the control circuitry may compute the new horizontal view position using one of the techniques described above. In some embodiments, the new horizontal view position may be based on whether the vehicle pitch is shallow or steep. For example, the control circuitry may select the new horizontal view position to be behind the front of the vehicle when the pitch is shallow (e.g., under 30°) and select the new horizontal view position to be in front of the vehicle when the pitch is steep (e.g., over 30°). In some embodiments, the offset for the new horizontal view position (e.g., offset in the direction of the motion of the vehicle) may be proportional to pitch of the vehicle.

At 416, the control circuitry may generate a view of the environment outside of the vehicle from the selected angle and selected horizontal view position. In some embodiments, the control circuitry may, optionally, adjust one or more of the cameras at step 418 to acquire this view. In some embodiments, the control circuitry may use data from several cameras to create a virtual camera that can provide an extrapolated view from the selected angle and the selected horizontal view position that is identical or similar to a view that would be a generated by a physical camera if it were placed at the selected angle and at the selected view horizontal view position.

At step 420, the control circuitry may display the generated view (e.g., at display 302 of FIG. 3). In some embodiments, process 400 may then return to step 402. For example, the cycle may be repeated at any interval (e.g., every one or two seconds) to continuously update the view depending on the changing state of the vehicle (e.g., as it drives over rocky terrain as depicted in FIG. 2). In some embodiments, the frequency of the cycle may be set proportionally to the speed of the vehicle.

It will be understood that system 300 of FIG. 3 and process 400 of FIG. 4 are merely illustrative and that various modifications and additions can be made within the scope of the disclosure. In some embodiments, multiple camera systems 300 may be implemented in a vehicle or multiple views can be generated from a single camera system 300. For example, a first system can be used for generating a front view and a second system can be used for generating a rear view. A rear view is useful when a vehicle is traveling backwards. For example, off-roading on difficult terrain (e.g., rock crawling) can involve repeatedly maneuvering a vehicle forwards and reverse in order to precisely orient the vehicle to traverse the terrain. In some embodiments, the rear view replaces the front view when a vehicle is either in reverse or is traveling backwards. In some embodiments, the rear view is displayed on a different portion of the display or on a different display. It will also be understood that any number of views (e.g., front, left, right, and rear) can be generated in accordance with this disclosure.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
   at least one camera configured to capture data associated with at least one real view of environment outside of the vehicle;
   a display for generating at least one virtual view of the environment outside of the vehicle based on the data captured using the at least one camera; and
   a control circuitry configured to:

detect a pitch angle of the vehicle;
select a position of a virtual camera in relation to a length of the vehicle, wherein:
the position of the virtual camera is selected to be ahead of a front of the vehicle when pitch angle of the vehicle is above a threshold; and
the position of the virtual camera is selected to be behind the front of the vehicle when pitch angle of the vehicle is below the threshold;
generate a virtual view of the environment outside of the vehicle from the selected position of the virtual camera based on the data captured using the at least one camera; and
provide for display of the generated virtual view on the display of the vehicle.

2. The system of claim 1 wherein the control circuitry is configured to generate the virtual view by extrapolating an image based on the data captured using the at least one camera.

3. The system of claim 1 wherein the control circuitry is configured to generate the virtual view by combing data captured using two or more cameras.

4. The system of claim 1, wherein the control circuitry is further configured to:
adjust the position of the virtual camera in relation to the length of the vehicle proportionally to a change in the pitch angle of the vehicle.

5. The system of claim 1, wherein the control circuitry is further configured to:
display a predicted path of front wheels of the vehicle overlaid over the virtual view.

6. The system of claim 1, wherein the control circuitry is configured to generate the virtual view of the environment outside of the vehicle from the selected position of the virtual camera by:
generating a view that approximates a view of the environment outside of the vehicle that would be captured by a real camera if it was placed in the selected position of the virtual camera.

7. A method, the method comprising:
capturing, using at least one camera, data associated with at least one real view of environment outside of a vehicle;
detecting, using control circuitry a pitch angle of the vehicle;
selecting, using the control circuitry, a position of a virtual camera in relation to a length of the vehicle, wherein:
the position of the virtual camera is selected to be ahead of a front of the vehicle when pitch angle of the vehicle is above a threshold; and
the position of the virtual camera is selected to be behind the front of the vehicle when pitch angle of the vehicle is below the threshold;
generating, using the control circuitry, a virtual view of the environment outside of the vehicle from the selected position of the virtual camera based on the data captured using the at least one camera; and
providing for displaying, on a display of the vehicle, the generated virtual view on the display of the vehicle.

8. The method of claim 7, wherein generating the virtual view comprises extrapolating an image based on the data captured using the at least one camera.

9. The method of claim 7, wherein generating the virtual view comprises combing data captured using two or more cameras.

10. The method of claim 7, further comprising:
adjusting the position of the virtual camera in relation to the length of the vehicle proportionally to a change in the pitch angle of the vehicle.

11. The method of claim 7, further comprising:
adjusting the position of the virtual camera in relation to the length of the vehicle proportionally to a change in the speed of the vehicle.

12. A non-transitory computer readable medium having instructions encoded thereon, that when executed by control circuitry of a vehicle causes the control circuitry to:
capture, using at least one camera, data associated with at least one real view of environment outside of the vehicle;
detect a pitch angle of the vehicle;
selecting a position of a virtual camera in relation to a length of the vehicle, wherein:
the position of the virtual camera is selected to be ahead of a front of the vehicle when pitch angle of the vehicle is above a threshold; and
the position of the virtual camera is selected to be behind the front of the vehicle when pitch angle of the vehicle is below the threshold;
generate a virtual view of the environment outside of the vehicle from the selected position of the virtual camera based on the data captured using the at least one camera; and
provide for display, on a display of the vehicle, the generated virtual view on the display of the vehicle.

13. The method of claim 7, further comprising:
displaying a predicted path of front wheels of the vehicle overlaid over the virtual view.

14. The method of claim 1, wherein the generating the virtual view of the environment outside of the vehicle from the selected position of the virtual camera comprises:
generating a view that approximates a view of the environment outside of the vehicle that would be captured by a real camera if it was placed in the selected position of the virtual camera.

15. The system of claim 1, wherein:
the position of the virtual camera is selected to be ahead of the front of the vehicle when pitch angle of the vehicle is above a threshold to provide a view of a terrain that wheels of the vehicle are about to drive over; and
the position of the virtual camera is selected to be behind the front of the vehicle when pitch angle of the vehicle is below the threshold to provide increased angle of view of terrain ahead of the vehicle.

* * * * *